United States Patent [19]

Fischer et al.

[11] Patent Number: 4,486,562
[45] Date of Patent: Dec. 4, 1984

[54] PROCESS FOR MAKING VULCANIZED CARBON BLACK-REINFORCED BROMOBUTYL RUBBER FILMS

[75] Inventors: Erhardt Fischer; Douglas C. Edwards, both of Sarnia, Canada

[73] Assignee: Polysar Limited, Sarnia, Canada

[21] Appl. No.: 590,170

[22] Filed: Mar. 16, 1984

[30] Foreign Application Priority Data

Jun. 2, 1983 [CA] Canada ................................. 429538

[51] Int. Cl.$^3$ .............................................. C08K 3/04
[52] U.S. Cl. ..................................... 524/156; 523/344; 524/332; 524/400; 524/552; 524/572; 524/574; 528/502; 528/503
[58] Field of Search ................ 523/344; 524/156, 332, 524/400, 552, 574, 572; 528/502, 503

[56] References Cited

U.S. PATENT DOCUMENTS

| 2,944,038 | 7/1960 | Hunter et al. | 524/395 |
| 2,964,489 | 12/1960 | Baldwin et al. | 525/356 |
| 2,983,705 | 5/1961 | Baldwin et al. | 524/343 |
| 2,983,706 | 5/1961 | Baldwin et al. | 524/343 |
| 2,983,707 | 5/1961 | Baldwin et al. | 524/343 |
| 2,984,642 | 5/1961 | Minckler et al. | 525/375 |
| 3,011,996 | 12/1961 | Kuntz et al. | 525/375 |
| 3,062,767 | 11/1962 | Hunter et al. | 524/574 |
| 3,534,123 | 10/1970 | Bolstock et al. | 524/572 |
| 3,646,166 | 2/1972 | Canter et al. | 525/301 |
| 3,898,253 | 8/1975 | Buckler et al. | 524/572 |
| 3,998,772 | 12/1976 | Beerbower et al. | 524/571 |
| 4,256,857 | 3/1981 | Buckler et al. | 525/379 |
| 4,357,432 | 11/1982 | Edwards | 523/344 |

Primary Examiner—Herbert J. Lilling
Attorney, Agent, or Firm—Stevens, Davis, Miller & Mosher

[57] ABSTRACT

A process is provided for preparing a vulcanized carbon black-reinforced chloro- or bromobutyl rubber film comprising admixing a polyfunctional amine vulcanization system with a carbon black-reinforced chloro- or bromobutyl rubber latex containing one or more selected emulsifiers, forming a film from the resulting mixture, drying said film and heating the dried film to provide the vulcanized film. The process may be used in the manufacture of coatings, dipped goods and chemical resistant impermeable treated fabrics.

8 Claims, No Drawings

PROCESS FOR MAKING VULCANIZED CARBON BLACK-REINFORCED BROMOBUTYL RUBBER FILMS

FIELD OF THE INVENTION

This invention relates to a process for preparing vulcanized carbon black-reinforced chloro- or bromobutyl rubber films.

DESCRIPTION OF THE PRIOR ART

A number of methods have been described in the art for preparing latexes of polymers made by solution polymerization techniques. Such polymers are removed from the reaction zone as hydrocarbon solutions generally known as "cements" and these polymer cements may then be used to form aqueous emulsions or latexes of the polymers. Alternately such polymers may be recovered from their cements and re-dissolved in a hydrocarbon solvent to provide solutions which are then used to make the latexes. For example, U.S. Pat. No. 3,226,349 teaches a process for preparing stable latexes from ethylene-alpha olefin copolymer cements using a specific combination of emulsifiers and a stabilizer for the emulsifier system. U.S. Pat. Nos. 2,944,038 and 3,062,767 teach processes for preparing butyl rubber latexes using ammonium or alkali metal salts of fatty acids as emulsifiers, polyvinyl alcohol as a protective colloid, and a polyoxyethylated alkyl phenol as a foam suppressant. U.S. Pat. No. 3,998,772 teaches a process for preparing butyl rubber or EPDM rubber latexes by emulsifying the rubber cement in water containing an ammonium or alkali metal salt of a $C_{12-24}$ fatty acid as a soap and a long chain aliphatic mono- or dicarboxylic acid or anhydride salt as a stabilizer. Canadian Patent No. 683,226 teaches a process for preparing halogenated butyl rubber latexes using a variety of emulsifiers.

Methods for making reinforced polymer latexes are also known. Such latexes comprise an intimate mixture of the polymer and a reinforcing material such as carbon black wherein the reinforcing material has a strengthening effect upon the polymer. For example, U.S. Pat. No. 3,228,905 teaches a method for incorporating particles of a reinforcing material into a butadiene polymer by mixing a latex of the polymer with an aqueous dispersion of the reinforcing material and subsequently freezing and thawing the mixture. U.K. Patent No. 1,116,839 teaches a method of preparing a reinforced polymer latex by intimately mixing a solution of a reinforced polymer composition in an organic solvent with an aqueous solution of any conventional emulsifier and then removing the solvent. Vulcanization ingredients may be incorporated at any stage including using conventional latex compounding techniques and cured films may be obtained therefrom. U.K. Patent No. 1,295,250 teaches a method for preparing reinforced polymer latexes comprising mixing a polymer and a reinforcing material such as carbon black on a rubber mill or Banbury, dissolving the mixture in a solvent having a boiling point, or forming a water azeotrope having a boiling point, less than that of water, adding water and an emulsifier to the solution and mixing, for example in a homogenizer, stripping the solvent using a vapor such as steam for the continuous fluid driving phase, and separating the latex from the continuous phase. A wide variety of emulsifiers may be used.

Further, it is known that halogenated butyl rubber may be vulcanized using organic amine compounds at temperatures as low as room temperature or below. The teachings of U.S. Pat. Nos. 2,964,489; 2,983,705; 2,983,707; 2,984,642; 3,011,996; 3,898,253; and 4,256,857 are exemplary.

Reinforced polymer latexes may be used in preparing films for coatings, dipped goods such as gloves and in making impermeable treated fabrics Chloro- or bromobutyl rubbers are desirable polymers to use in such applications where low permeability and general chemical resistance are required. Both rubbers also have the advantage of being vulcanizable at relatively fast rates under relatively mild conditions. In latex compounding, it is often desirable to premix a quantity of latex with the necessary compounding ingredients, including a vulcanization system, and use the mixture over a length of time or even store it for some time before using it. Based on the prior art of using amine vulcanization systems for dry chloro- or bromobutyl rubbers, one skilled in the art would not consider it possible to use such a vulcanization system in chloro- or bromobutyl latex as vulcanization would likely occur fairly rapidly at room temperature, thereby making the compounded latex unusable after a short period of time.

In contrast to the case in which a dry rubber composition, obtained by mixing chloro- or bromobutyl rubber, carbon black, one or more selected emulsifiers, and a polyfunctional amine vulcanization system, forms a vulcanizate at room temperature, it has surprisingly been found that a carbon black-reinforced chloro- or bromobutyl rubber latex containing the selected emulsifiers and the polyfunctional amine vulcanization system is stable for up to a few weeks at room temperature, that a dried film obtained from such a latex mixture exhibits minimal vulcanization after several days at room temperature, but that when the dried film is heated for a few minutes at temperatures of at least about 100° C. a vulcanized film is formed having good strength properties.

SUMMARY OF THE INVENTION

Accordingly the present invention provides a process for making a vulcanized carbon black-reinforced chloro- or bromobutyl rubber film comprising (a) admixing a polyfunctional amine vulcanization system with a carbon black-reinforced chloro- or bromobutyl rubber latex wherein said latex contains an emulsifier selected from (i) ammonium and alkali metal $C_{12-24}$ fatty acid soaps and mixtures of any two or more of said soaps, (ii) ammonium and alkali metal salts of polyethoxylated sulfates of $C_{6-20}$ alkyl alcohols wherein the number of ethoxylate units is from about 2 to about 50, and (iii) polyethoxylated $C_{6-14}$ alkylphenoxy ethanols and the ammonium and alkali metal salts of the sulfates thereof wherein the number of ethoxylate units is from about 2 to about 150; (b) forming a film from the resulting mixture; (c) drying said film in air at a temperature of from about 20° to about 80° C. for a time sufficient to remove essentially all of the water from said film; and (d) heating the dried film for a time of from about 3 to about 15 minutes at a temperature of from about 100° to about 175° C. to cause the formation of said vulcanized rubber film.

DETAILED DESCRIPTION

Butyl rubber is a polymer comprising a major portion of a $C_{4-6}$ isoolefin, typically from 95 to 99.5 weight percent isobutylene, and a minor portion of a $C_{4-6}$ conjugated diolefin, typically from 0.5 to 5 weight percent isoprene. Butyl rubber may be halogenated by methods known in the art to provide chlorobutyl or bromobutyl rubber. Chlorobutyl rubber may contain from about 0.5 to about 5, preferably from about 0.8 to about 1.5, weight percent chlorine. Bromobutyl rubber may contain from about 0.5 to about 15, preferably from about 1 to about 3, weight percent bromine. It is preferred to use bromobutyl rubber in connection with the process of the present invention.

The carbon black-reinforced chloro- or bromobutyl rubber latex used in connection with the process of the present invention may be prepared by any of the methods known in the art using an emulsifier selected as described hereinabove. It is preferred to use methods which provide a latex with high levels of reinforcement in order to obtain high strength rubber films. For example, as taught in U.K. Patent No. 1,116,839, the rubber may be dissolved in a solvent such as cyclohexane and carbon black is then added to the solution followed by mixing under high shear to form a solution of reinforced rubber. Alternately the carbon black may be mixed under high shear with the solvent and the resulting dispersion mixed with a solution of the rubber to form a solution of reinforced rubber. In either case, the solution of reinforced rubber is then mixed with an aqueous solution of the emulsifier and the solvent removed to provide the reinforced rubber latex. Alternately, as taught in U.K. Patent No. 1,295,250, the rubber may be mixed with carbon black on masticating equipment such as a rubber mill and the resulting composition dispersed in a solvent such as cyclohexane to form a cement. Water and an emulsifier selected as described hereinabove are mixed with the cement to form an emulsion and the solvent is then stripped off by, for example, distillation under reduced pressure to provide the reinforced rubber latex.

The latex preferably may have a total solids content of from about 40 to about 55 percent by weight and a viscosity of from about 2.5 to about 7.5 poise as measured at 25° C. using a Brookfield Model LVF Viscometer with a No. 3 spindle at 30 rpm.

The carbon black present in the reinforced rubber latex used in connection with the process of the present invention should be of the type known in the art to provide medium-high to high reinforcement. Examples of suitable carbon blacks include those grades designated according to ASTM D 1765 as N650, N375, N347, N339, N330, N220 and N110. Suitable amounts of carbon black which may be used are from about 10 to about 70 parts by dry weight per 100 parts by dry weight of the rubber and preferably from about 35 to about 50 parts.

The emulsifier which is present in the reinforced rubber latex used in connection with the process of the present invention is selected as stated hereinabove. The emulsifier may be selected from ammonium and alkali metal salts of $C_{12-24}$ fatty acids, commonly referred to as soaps of said fatty acids, and mixtures of any two or more of said salts. Suitable fatty acid soaps include the ammonium, sodium and potassium salts of oleic acid, palmitic acid, stearic acid and linoleic acid. Oleic acid salts are preferred, most especially potassium oleate. Further, the emulsifier may be selected from ammonium and alkali metal salts of polyethoxylated sulfates of $C_{6-20}$ alkyl alcohols wherein the number of ethoxylate units is from about 2 to about 50. Suitable such emulsifiers include those commercially available from Stepan Chemical Company under the trade name POLYSTEP® including the grades known as POLYSTEP B-11, B-12, B-19, B-20, B-22 and B-23. The emulsifier may also be selected from polyethoxylated $C_{6-14}$ alkylphenoxy ethanols and the ammonium and alkali metal salts of the sulfates thereof wherein the number of ethoxylate units is from about 2 to about 150. Suitable such ethanols include those commercially available from GAF Corporation under the trade name IGEPAL® including the grades known as IGEPAL CA-420, CA-520, CA-620, CA-630, CA-720 and CO-430. Suitable such salts include those commercially available from Stepan Chemical Company under the trade name POLYSTEP including the grades known as POLYSTEP B-1 and B-27, those commercially available from GAF Corporation under the trade name ALIPAL® including the grade known as ALIPAL CO-433, and those commercially available from Domtar Incorporated under the trade name FENOPON® including the grade known as FENOPON CO-433N.

It is preferred that the emulsifier is selected from the aforesaid fatty acid soaps. It has been found that when such emulsifiers are present in the reinforced rubber latex, the vulcanized film produced by the process of the present invention has good properties as measured by tensile strength, elongation and modulus. The properties of the vulcanized films obtained from latexes containing the other types of emulsifiers described hereinabove are reduced in comparison. It has also been shown that when each of the aforesaid types of emulsifiers is dry-mixed with the rubber using conventional dry rubber compounding techniques, and the resulting rubber compound is vulcanized using the same polyfunctional amine vulcanization system, the properties of the vulcanizate are reduced only marginally when the fatty acid soaps are present, in comparison to the same compound containing no emulsifier, but the properties are reduced somewhat more substantially when the other types of emulsifiers are present in the compound.

Suitable amounts of the emulsifier present in the reinforced rubber latex used in connection with the process of the present invention are from about 5 to about 15 parts by dry weight per 100 parts by dry weight of the rubber, preferably from about 7 to about 14 parts, and most preferably from about 7 to about 10 parts.

The polyfunctional amine vulcanization system used in connection with the process of the present invention comprises $C_{4-24}$ organic nitrogen-containing compounds and optionally one or more other compounds which function as vulcanization accelerators. The organic nitrogen-containing compounds are selected from those compounds having at least two amino groups wherein the amino groups may be primary, secondary tertiary or mixtures thereof. Suitable such compounds include 1,6-hexane diamine, tetramethylene diamine, diamino cyclohexane, phenylene diamine, benzidine and other diamino biphenyls, poly(oxypropylene) diamines and triamines, N,N'-diethyl hexamethylene diamine, N-methyl pentamethylene diamine, N-methyl phenylene diamine, hexamethylene tetramine, piperazine, N-(3-aminopropyl) piperazine, and N, N, N', N'-tetramethylbutane diamine.

Suitable amounts of the organic nitrogen-containing compounds used in connection with the process of the present invention are from about 0.2 to about 20 parts by dry weight per 100 parts by dry weight of the rubber, preferably from about 0.5 to 10 parts and most preferably from about 0.5 to about 5 parts.

The polyfunctional amine vulcanization system may additionally comprise one or more of certain proprietary vulcanization accelerators for use with the organic nitrogen-containing compound or compounds. For example, a suitable accelerator is sold by Texaco Chemical Company under the trade name Accelerator 399. When used, suitable amounts of the accelerators are from about 0.1 to about 3 parts by dry weight per 100 parts by dry weight of the rubber.

The reinforced rubber latex is admixed with the polyfunctional amine vulcanization system using any latex mixing technique known to the art, for example using marine propellor agitation. The resulting mixture may be used to form vulcanized films in the manufacture of coatings, dipped goods such as gloves, or impermeable chemical resistant treated fabrics.

Films for use as coatings may be prepared by the process of the present invention. The latex mixture may be spread on any suitable substrate to provide a wet film of desired thickness. The wet film is then allowed to dry in air at a temperature of from about 20° to about 80° C. for a time sufficient to remove essentially all of the water from the film. Removal of the water is necessary in order to prevent blistering of the film during the subsequent heating step. For example, the wet film may be dried in air for a time of from about 3 to about 20 days at a temperature of from about 20° to about 25° C. and subsequently for a time of from about 3 to about 8 hours at a temperature of from about 60° to about 80° C. in, for example, a forced air oven. The physical properties of this dried film, as measured by the tensile strength, elongation and modulus, are not acceptable for coatings or other practical applications. The dried film must be heated for a time of from about 3 to about 15 minutes at a temperature of from about 100° to about 175° C., preferably from about 130° to about 175° C., and most preferably from about 155° to about 175° C. to cause formation of a vulcanized rubber film on the substrate with acceptable physical properties for such a coating.

Films for use as dipped goods such as gloves may also be prepared by the process of the present invention. After the reinforced rubber latex is admixed with the polyfunctional amine vulcanization system, a former may be dipped into and coated with the mixture to form a film on the former. The film is dried in air as described above and the dipping repeated as often as desired to form a film of the required thickness as is known in the art. Alternately, the former may be coated with a coagulant such as a strong mineral acid, glacial acetic acid or inorganic salts of strong mineral acids, for example calcium nitrate, calcium chloride, magnesium sulfate or aluminum sulfate. The coated former is then dipped into and coated with the mixture to form a film on the former. The film is then dried and heated as hereinabove described.

Impermeable chemical resistant treated fabrics may also be prepared by the process of the present invention. After the reinforced rubber latex is mixed with the polyfunctional amine vulcanization system, the resulting mixture may be coated on a sheet of fabric, for example a cotton fabric, with a spreading knife to form a film on the fabric. The film is air dried as before in, for example, a forced air oven and the coating and drying repeated as often as desired. The resulting film is then heated as before in, for example, a forced air oven to form the treated fabric. Alternately, the fabric may be dipped one or more times into the latex so as to form a continuous film which is then dried and heated in the same manner.

In the process of the present invention, other compounding ingredients may be admixed with the reinforced rubber latex along with the vulcanization system in amounts well known to the art. These ingredients include softeners, stabilizers, antioxidants, and viscosity modifiers.

The following examples illustrate the process of the present invention and are not intended to be limiting.

EXAMPLE 1

A commercially available bromobutyl rubber containing about 2.1 weight percent bromine and sold under the trade name POLYSAR ® Bromobutyl X2 by Polysar Limited was used in this and the examples which follow as was a commercially available ASTM type N-330 carbon black sold under the trade name VULCAN ® 3 by Cabot Corporation. This example illustrates the process of the present invention. Using the amounts of materials shown in Table 1, bromobutyl rubber was mixed with carbon black on a cool rubber mill, cut up and dispersed in cyclohexane using gentle agitation at room temperature. The resulting solution was added slowly over a period of 4 minutes to a solution of potassium oleate in distilled water in a Gifford-Wood Model 1-LV homogenizer with agitation at 7500 rpm and agitation was continued for a further 3 minutes. During agitation, the temperature of the mixture rose from room temperature to about 50° C. The resulting mixture was transferred to a multi-necked round bottom flask and essentially all of the cyclohexane was distilled off along with some of the water by heating the contents of the flask with slow stirring under partial vacuum on a laboratory vacuum concentrator with the water bath maintained at 55°–58° C. Distillation was continued until the total solids content of the resulting latex was 40–55 percent by weight and the Brookfield LVF viscosity was 2.5–7.5 poise. This latex was transferred to a container equipped with a marine propellor agitator and agitation was initiated. 1,6-Hexane diamine was added slowly to the latex and agitation was continued for 20 minutes and then the resulting mixture was allowed to stand at room temperature for about 2 hours without agitation. The mixture was then screened through an 80 mesh sieve onto one or more 18 cm by 51 cm smooth TEFLON ® covered boards and spread with a Gardner knife having a clearance of 0.76 mm. The resulting films were allowed to dry at room temperature for 1 day, removed from the board, dusted with talc, hung up to dry for at least 3 more days at room temperature, and then placed on aluminum foil and dried in a forced air oven at 70° C. for the period of time shown in Table 2. The dried films supported on the aluminum foil were then heated in a forced air oven at the temperature and for the times shown in order to cause the formation of vulcanized films. Modulus, tensile strength and elongation were then determined using ASTM dumbbells cut from the films. Results are given in Table 2. Experiments 1 and 5A are comparative controls.

TABLE 1

|  | (Control) 1 | 2 | 3 | 4 | 5 |
|---|---|---|---|---|---|
| Ingredients (parts by weight) | | | | | |
| Bromobutyl rubber | 100 | 100 | 100 | 100 | 100 |

TABLE 1-continued

|  | (Control) 1 | 2 | 3 | 4 | 5 |
|---|---|---|---|---|---|
| Carbon black | 40 | 40 | 40 | 40 | 40 |
| Cyclohexane | 1260 | 1260 | 1260 | 1260 | 1260 |
| Potassium oleate | 14 | 14 | 14 | 14 | 14 |
| Distilled water | 1723 | 1723 | 1723 | 1723 | 1723 |
| 1,6-Hexane diamine | — | 0.25 | 0.5 | 0.75 | 1.0 |
| Latex Properties |  |  |  |  |  |
| Total solids (wt. %) | 43.8 | 43.8 | 43.9 | 43.9 | 43.9 |
| pH | 9.8 | 10.6 | 11.5 | 12.0 | 12.2 |
| Brookfield viscosity (poise) | 2.8 | 3.2 | 3.4 | 3.5 | 3.8 |

TABLE 2

| Film Properties | 1 (control) | 2 A | 2 B | 3 A | 3 B | 3 C | 3 D | 4 A | 4 B | 4 C | 4 D | 5 A (Control) | 5 B |
|---|---|---|---|---|---|---|---|---|---|---|---|---|---|
| Drying time at room temperature (days) | 4 | 4 | 4 | 4 | 4 | 4 | 4 | 4 | 4 | 4 | 4 | 6 | 6 |
| at 70° C. (hours) | 4 | 4 | 4 | 4 | 4 | 4 | 4 | 4 | 4 | 4 | 4 | 4 | 4 |
| Heating time (minutes) |  |  |  |  |  |  |  |  |  |  |  |  |  |
| at 100° C. | — | — | — | 10 | — | — | — | 10 | — | — | — | — | — |
| at 135° C. | — | 5 | — | — | 5 | 10 | — | — | 5 | 10 | — | — | — |
| at 160° C. | 5 | — | 5 | — | — | — | 5 | — | — | — | 5 | — | 5 |
| Average film thickness (mm) | 0.37 | 0.46 | 0.36 | 0.40 | 0.44 | 0.40 | 0.37 | 0.44 | 0.43 | 0.38 | 0.34 | 0.53 | 0.49 |
| Modulus (kg/cm²) |  |  |  |  |  |  |  |  |  |  |  |  |  |
| 100% | 6 | 7 | 9 | 6 | 8 | 10 | 14 | 6 | 9 | 12 | 15 | 6 | 19 |
| 300% | 6 | 11 | 28 | 7 | 18 | 35 | 56 | 8 | 24 | 45 | 68 | 6 | — |
| 500% | 5 | 20 | — | 11 | 38 | — | — | 14 | 53 | — | — | 7 | — |
| Tensile strength (kg/cm²) | 6 | 26 | 59 | 16 | 45 | 67 | 74 | 18 | 57 | 74 | 76 | 11 | 85 |
| Elongation (%) | 1380 | 640 | 485 | 765 | 565 | 460 | 365 | 675 | 530 | 420 | 325 | 1500 | 255 |

Control experiment 1 demonstrates that very weak films are produced when no vulcanization system is used. Control experiment 5A shows that very weak films are produced when the heating step is omitted.

EXAMPLE 2

This example illustrates the process of the present invention using a reinforced bromobutyl rubber latex containing a different emulsifier than that of Example 1 and using a different vulcanization system. Thus, films were prepared as described in Example 1 except that potassium oleate was replaced by the sodium salt of a sulfated nonylphenoxy polyethyleneoxy ethanol sold under the trade name FENOPON® CO-433N by Domtar Incorporated and 1,6-hexane diamine was replaced by N, N, N', N'-tetramethylbutane diamine. Results are provided in Table 3.

TABLE 3

| Ingredients (parts by weight) | 1 | 2 | 3 |
|---|---|---|---|
| Bromobutyl rubber | 100 | 100 | 100 |
| Carbon black | 40 | 40 | 40 |
| Cyclohexane | 1260 | 1260 | 1260 |
| FENOPON CO-433N | 14 | 14 | 14 |
| Distilled water | 1723 | 1723 | 1723 |
| N,N,N',N'—Tetramethylbutane diamine | 2 | 4 | 6 |
| Latex Properties |  |  |  |
| Total solids (wt. %) | 45.6 | 45.9 | 46.2 |
| pH | 11.3 | 11.5 | 11.7 |
| Brookfield viscosity (poise) | 2.6 | 2.7 | 2.9 |

| Film Properties | A | B | A | B | A | B |
|---|---|---|---|---|---|---|
| Drying time |  |  |  |  |  |  |
| at room temperature (days) | 4 | 4 | 4 | 4 | 4 | 4 |
| at 70° C.(hours) | 4 | 4 | 4 | 4 | 4 | 4 |
| Heating time (minutes) |  |  |  |  |  |  |
| at 135° C. | 10 | — | 10 | — | 10 | — |
| at 160° C. | — | 10 | — | 10 | — | 10 |
| Average film thickness (mm) | 0.54 | 0.39 | 0.51 | 0.50 | 0.43 | 0.43 |
| Modulus (kg/cm²) |  |  |  |  |  |  |
| 100% | 5 | 5 | 5 | 5 | 6 | 5 |
| 300% | 8 | 6 | 11 | 10 | 14 | 11 |
| 500% | 20 | 11 | 31 | 25 | 39 | 27 |
| Tensile strength (kg/cm²) | 62 | 30 | 82 | 39 | 95 | 39 |
| Elongation (%) | 925 | 980 | 860 | 670 | 820 | 640 |

EXAMPLE 3

In this example Experiments 1C, 1D, 2C and 2D illustrate the process of the present invention while Experiments 1A, 1B, 2A and 2B are comparative. Films were prepared as described in Example 1 and results are provided in Table 4.

TABLE 4

| Ingredients (parts by weight) | 1 | | | | 2 | | | |
|---|---|---|---|---|---|---|---|---|
| Bromobutyl rubber | 100 | | | | 100 | | | |
| Carbon black | 40 | | | | 40 | | | |
| Cyclohexane | 1260 | | | | 1260 | | | |
| Potassium oleate | 7.3 | | | | 7.3 | | | |
| Distilled water | 1723 | | | | 1723 | | | |
| 1,6-Hexane diamine | 0.75 | | | | 1.0 | | | |
| Latex Properties | | | | | | | | |
| Total solids (wt. %) | 52.1 | | | | 52.1 | | | |
| pH | 11.5 | | | | 12.1 | | | |
| Brookfield viscosity (poise) | 6.5 | | | | 4.4 | | | |
| Film Properties | A | B | C | D | A | B | C | D |
| Drying Time | | | | | | | | |
| at room temperature (days) | 11 | 17 | 4 | 4 | 11 | 17 | 4 | 4 |
| at 70° C. (hours) | 4 | 4 | 4 | 4 | 4 | 4 | 4 | 4 |
| Heating time (minutes) | | | | | | | | |
| at 135° C. | — | — | 5 | — | — | — | 5 | — |
| at 160° C. | — | — | — | 5 | — | — | — | 5 |
| Average film thickness (mm) | 0.34 | 0.46 | 0.35 | 0.39 | 0.44 | 0.34 | 0.42 | 0.35 |
| Modulus (kg/cm$^2$) | | | | | | | | |
| at 100% | 6 | 6 | 8 | 13 | 6 | 6 | 9 | 17 |
| at 300% | 8 | 9 | 26 | 72 | 9 | 12 | 43 | 115 |
| at 500% | 15 | 16 | 67 | — | 17 | 25 | 104 | — |
| Tensile strength (kg/cm$^2$) | 41 | 35 | 77 | 107 | 41 | 48 | 113 | 126 |
| Elongation (%) | 1125 | 950 | 550 | 385 | 1025 | 930 | 520 | 310 |

The films prepared in the comparative experiments have properties which are inferior to those of the films prepared according to the process of the present invention.

EXAMPLE 4

This example is comparative and illustrates that bromobutyl rubber, when mixed in the dry state with carbon black, potassium oleate and 1,6-hexane diamine, can be vulcanized at room temperature. The ingredients shown in Table 5 were mixed on a rubber mill with cold water running through the rolls. The resulting mixture was formed into sheets and left at room temperature for 2 weeks. Physical properties were then determined using standard ASTM methods and results are given in Table 5.

TABLE 5

| | 1 | 2 | 3 | 4 |
|---|---|---|---|---|
| Ingredients (part by weight) | | | | |
| Bromobutyl rubber | 100 | 100 | 100 | 100 |
| Carbon black | 40 | 40 | 40 | 40 |
| 1,6-Hexane diamine | 1.5 | 1.5 | 1.5 | 1.5 |
| Potassium oleate | 5 | 7.5 | 10 | 14 |
| Physical Properties | | | | |
| Modulus (kg/cm$^2$) | | | | |

TABLE 5-continued

| | 1 | 2 | 3 | 4 |
|---|---|---|---|---|
| 100% | 16 | 16 | 16 | 12 |
| 300% | 80 | 70 | 70 | 48 |
| Tensile strength (kg/cm$^2$) | 146 | 140 | 150 | 98 |
| Elongation (%) | 450 | 570 | 590 | 530 |

EXAMPLE 5

In this example, Experiments 1D, 2D and 3D illustrate the process of the present invention whereas all other experiments are comparative. Films were prepared as in Example 1 except that following the addition of the amine vulcanization system to the latex, stirring was continued for only 2 minutes and the resulting mixture was then used without deaeration. In this example, the vulcanization system was a mixture of a poly(oxypropylene) triamine sold under the trade name JEFFAMINE ® T-403 by Texaco Chemical Company used alone or with a proprietary accelerator sold under the trade name Accelerator 399 by Texaco Chemical Company. The vulcanization system was added to the latex as a 50 percent by weight aqueous solution. Results are given in Table 6.

TABLE 6

| Ingredients (parts by weight) | 1 | | | | 2 | | | | 3 | | | |
|---|---|---|---|---|---|---|---|---|---|---|---|---|
| Bromobutyl rubber | 100 | | | | 100 | | | | 100 | | | |
| Carbon black | 40 | | | | 40 | | | | 40 | | | |
| Cyclohexane | 1260 | | | | 1260 | | | | 1260 | | | |
| Potassium oleate | 14 | | | | 14 | | | | 14 | | | |
| Distilled water | 1723 | | | | 1723 | | | | 1723 | | | |
| JEFFAMINE T-403 | 3 | | | | 3 | | | | 5 | | | |
| Accelerator 399 | 1 | | | | 3 | | | | — | | | |
| Latex Properties | | | | | | | | | | | | |
| Total solids (wt. %) | 52.0 | | | | 52.0 | | | | 52.0 | | | |
| pH | NOT | | | | | | | | 11.5 | | | |
| Brookfield viscosity (poise) | MEASURED | | | | | | | | 7.1 | | | |
| Film Properties | A | B | C | D | A | B | C | D | A | B | C | D |
| Drying time | | | | | | | | | | | | |
| room temperature (days) | 1 | 2 | 7 | 7 | 1 | 2 | 7 | 7 | 1 | 2 | 7 | 7 |
| at 70° C. (hours) | 4 | 4 | 4 | 4 | 4 | 4 | 4 | 4 | 4 | 4 | 4 | 4 |
| Heating time (minutes) | | | | | | | | | | | | |
| at 160° C. | — | — | — | 5 | — | — | — | 5 | — | — | — | 5 |

TABLE 6-continued

| | | | | | | | | | | | | |
|---|---|---|---|---|---|---|---|---|---|---|---|---|
| Average film thickness (mm) | 0.44 | 0.45 | 0.49 | 0.46 | 0.42 | 0.46 | 0.45 | 0.46 | 0.49 | 0.44 | 0.52 | 0.52 |
| Modulus (kg/cm$^2$) | | | | | | | | | | | | |
| 100% | 4 | 4 | 4 | 13 | 4 | 4 | 5 | 11 | 4 | 4 | 5 | 10 |
| 300% | 3 | 4 | 5 | 89 | 3 | 4 | 7 | — | 3 | 4 | 6 | 61 |
| 500% | 3 | 4 | 7 | — | 3 | 4 | 14 | — | 3 | 3 | 9 | — |
| Tensile strength (kg/cm$^2$) | 4 | 5 | 13 | 104 | 3 | 6 | 23 | 50 | 3 | 4 | 16 | 61 |
| Elongation (%) | 1040 | 1080 | 875 | 330 | 795 | 880 | 740 | 245 | 865 | 1115 | 820 | 300 |

EXAMPLE 6

This example is comparative. Using the process described in Example 4, bromobutyl rubber, carbon black, JEFFAMINE ® T-403, Accelerator 399 and potassium oleate were mixed on a rubber mill. Fairly good vulcanizates were obtained after only 24 hours at room temperature and good vulcanizates were obtained after 7 days at room temperature or after heating for 5 minutes at 160° C. The presence of potassium oleate retarded the vulcanization only slightly. Results are given in Table 7.

TABLE 7

| | 1 | 2 | 3 | 4 | 5 | 6 |
|---|---|---|---|---|---|---|
| Ingredients (parts by weight) | | | | | | |
| Bromobutyl rubber | 100 | 100 | 100 | 100 | 100 | 100 |
| Carbon black | 40 | 40 | 40 | 40 | 40 | 40 |
| JEFFAMINE T-403 | 2.1 | 2.1 | 2.1 | 2.1 | 2.1 | 2.1 |
| Accelerator 399 | 1.4 | 1.4 | 1.4 | 1.4 | 1.4 | 1.4 |
| Potassium oleate | — | 14 | — | 14 | — | 14 |
| Vulcanization (time at temperature) | 5 minutes at 160° C. | | 24 hours at room temp. | | 7 days at room temp. | |
| Physical Properties | | | | | | |
| Modulus (kg/cm$^2$) | | | | | | |
| 100% | 20 | 20 | 7 | 4 | 10 | 8 |
| 300% | 150 | 125 | 17 | 12 | 60 | 38 |
| Tensile strength (kg/cm$^2$) | 185 | 150 | 89 | 80 | 150 | 122 |
| Elongation % | 360 | 340 | 900 | 800 | 570 | 610 |

EXAMPLE 7

This example is comparative and illustrates the effect of the emulsifier on the vulcanizate properties of dry mixed carbon black-reinforced bromobutyl rubber. The ingredients shown in Table 8 were mixed on a cool rubber mill, the resulting mixture formed into sheets and then vulcanized by heating the sheets in a forced air oven for 5 minutes at 160° C. Pnysical properties were then determined using standard ASTM methods and results are given in Table 8.

TABLE 8

| | 1 | 2 | 3 | 4 | 5 | 6 |
|---|---|---|---|---|---|---|
| Ingredients (parts by weight) | | | | | | |
| Bromobutyl rubber | 100 | 100 | 100 | 100 | 100 | 100 |
| Carbon black | 40 | 40 | 40 | 40 | 40 | 40 |
| 1,6-Hexane diamine | 0.71 | 0.71 | 0.71 | 0.71 | 0.71 | 0.71 |
| Potassium oleate | — | 10 | — | — | — | — |
| POLYSTEP B-11 | — | — | 10 | — | — | — |
| POLYSTEP B-27 | — | — | — | 10 | — | — |
| IGEPAL CA-630 | — | — | — | — | 10 | — |
| FENOPON CO-433N | — | — | — | — | — | 10 |
| Physical Properties | | | | | | |
| Modulus (kg/cm$^2$) | | | | | | |
| 100% | 15 | 20 | 6 | 6 | 8 | 6 |
| 300% | 75 | 65 | 10 | 12 | 32 | 16 |
| Tensile strength (kg/cm$^2$) | 155 | 145 | 78 | 92 | 102 | 104 |
| Elongation (%) | 500 | 350 | 890 | 1000 | 590 | 870 |

The vulcanizate properties obtained from experiment 2 using potassium oleate are only marginally reduced in comparison to those from experiment 1 in which no emulsifier was mixed with the rubber. Experiments 3 through 6 show that the other emulsifiers reduce the vulcanizate properties more substantially.

What is claimed is:

1. A process for making a vulcanized carbon black-reinforced chloro- or bromobutyl rubber film comprising:

(a) admixing a polyfunctional amine vulcanization system with a carbon black-reinforced chloro- or bromobutyl rubber latex wherein said latex contains an emulsifier selected from (i) ammonium and alkali metal $C_{12-24}$ fatty acid soaps and mixtures of any two or more of said soaps, (ii) ammonium and alkali metal salts of polyethoxylated sulfates of $C_{6-20}$ alkyl alcohols wherein the number of ethoxylate units is from about 2 to about 50, and (iii) polyethoxylated $C_{6-14}$ alkylphenoxy ethanols and the ammonium and alkali metal salts of the sulfates thereof wherein the number of ethoxylate units is from about 2 to about 150;

(b) forming a film from the resulting mixture;

(c) drying said film in air at a temperature of from about 20° to about 80° C. for a time sufficient to remove essentially all of the water from said film; and (d) heating the dried film for a time of from about 3 to about 15 minutes at a temperature of from about 100° to about 175° C. to cause the formation of said vulcanized rubber film.

2. The process according to claim 1 wherein the rubber is bromobutyl rubber, the amount of carbon black used is from about 10 to about 70 parts by dry weight, the amount of said emulsifier used is from about 5 to about 15 parts by dry weight, and the amount of said vulcanization system used is from about 0.1 to about 20 parts by dry weight, all based on 100 parts by dry weight of bromobutyl rubber.

3. The process according to claim 1 wherein the rubber is chlorobutyl rubber, the amount of carbon black used is from about 10 to about 70 parts by dry weight, the amount of said emulsifier used is from about 5 to about 15 parts by dry weight, and the amount of said vulcanization system used is from about 0.1 to about 20 parts by dry weight, all based on 100 parts by dry weight of chlorobutyl rubber.

4. The process according to claim 2 wherein the emulsifier is selected from (i).

5. The process according to claim 4 wherein the amount of carbon black is from about 35 to about 50 parts, the amount of emulsifier is from about 7 to about 14 parts, the amount of vulcanization system is from about 0.5 to about 10 parts, and wherein the temperature used in step (d) is from about 130° to about 175° C.

6. The process according to claim 3 wherein the amount of emulsifier is from about 7 to about 10 parts, the amount of vulcanization system is from about 0.5 to about 5 parts, and wherein the temperature used in step (d) is from about 155° to about 175° C.

7. The process according to claim 5 wherein said emulsifier is potassium oleate.

8. The process according to claim 6 wherein said emulsifier is potassium oleate.

* * * * *